United States Patent [19]

Palmer

[11] Patent Number: 5,577,532

[45] Date of Patent: Nov. 26, 1996

[54] VALVE ACTUATOR

[76] Inventor: Thomas W. Palmer, 1403 Foster Lake Dr., Richmond, Tex. 77469

[21] Appl. No.: 273,406

[22] Filed: Jul. 11, 1994

[51] Int. Cl.⁶ .......................... F16K 17/20; F16K 31/124
[52] U.S. Cl. ............................ 137/460; 137/80; 137/457; 251/25; 92/65
[58] Field of Search ........................... 251/28, 25; 92/62, 92/65; 137/79, 80, 460, 458, 457

[56] References Cited

U.S. PATENT DOCUMENTS

| | | |
|---|---|---|
| 1,682,621 | 5/1927 | Taylor . |
| 2,072,314 | 3/1937 | Rhodes . |
| 2,207,491 | 7/1940 | Parker . |
| 2,397,299 | 3/1946 | Strid . |
| 2,413,301 | 12/1946 | Ellis . |
| 2,741,478 | 4/1956 | Mercier . |
| 2,791,093 | 5/1957 | Shafer . |
| 2,836,192 | 5/1958 | Shafer . |
| 2,849,987 | 9/1958 | Shafer . |
| 3,089,430 | 5/1963 | Shafer et al. . |
| 3,157,030 | 11/1964 | Anderson . |
| 3,196,615 | 7/1965 | Kautz . |
| 3,285,287 | 11/1966 | Curran .................. 251/28 X |
| 3,405,523 | 10/1968 | Adams . |
| 3,468,126 | 9/1969 | Mercier . |
| 3,505,814 | 4/1970 | Beard et al. . |
| 3,730,214 | 5/1973 | Brumm . |
| 3,765,181 | 10/1973 | Lang et al. . |
| 3,877,347 | 4/1975 | Sheesley et al. . |
| 3,901,274 | 8/1975 | Taber et al. . |
| 3,911,678 | 10/1975 | Shafer et al. . |
| 3,975,907 | 8/1976 | Polacek . |
| 4,102,128 | 7/1978 | Shafer et al. . |
| 4,141,533 | 2/1979 | Goodman . |
| 4,274,328 | 6/1981 | Pedersen ............. 137/460 X |
| 4,380,325 | 4/1983 | Palmer . |
| 4,460,152 | 7/1984 | Dipasquale et al. . |
| 4,476,678 | 9/1984 | Hall . |
| 4,585,205 | 4/1986 | Coppola et al. . |
| 4,585,207 | 4/1986 | Shelton ................. 92/65 X |
| 4,621,496 | 11/1986 | Lamb . |
| 4,679,764 | 7/1987 | Smith et al. . |
| 4,687,179 | 8/1987 | Smith . |
| 4,872,482 | 10/1989 | Jarrett . |
| 4,934,652 | 6/1990 | Golden ................. 92/65 X |
| 5,244,004 | 9/1993 | Robertson . |
| 5,309,934 | 5/1994 | Jaeger . |
| 5,331,882 | 7/1994 | Miller . |

OTHER PUBLICATIONS

"GM Series Gas Motor Valve Actuators," Pneugear, Inc. 1992.

Primary Examiner—Kevin Lee
Attorney, Agent, or Firm—Guy McClung

[57] ABSTRACT

An actuator has been developed for actuating a valve for controlling fluid flow in a conduit, the actuator having, in one aspect a housing with a main interior housing space, a rod with a mid-portion, a top end and a bottom end, the mid-portion movably disposed in the housing, the bottom end movably extending from the housing and interconnected with the valve, a first piston member secured to the rod and movable in the housing as the rod moves, a second piston member movably disposed in the housing above the first piston member, the second piston member movable to contact the first piston member, first power apparatus for moving the rod to open or close the valve, and second power apparatus for moving the second piston member to contact the first piston member moving the first piston member and the rod to close the valve. In one aspect the rod has a stop shoulder above the first piston member, and the second piston member is movable to contact the stop shoulder to move the rod. Valve systems have been developed which include a valve and such an actuator. Such actuators and systems may employ various structures, housings, and seals and various noted power supplies so that during operation no fluid from within the valve, the actuator, the system, or a flow conduit whose fluid flow is controlled by the valve escapes to the environment.

33 Claims, 7 Drawing Sheets

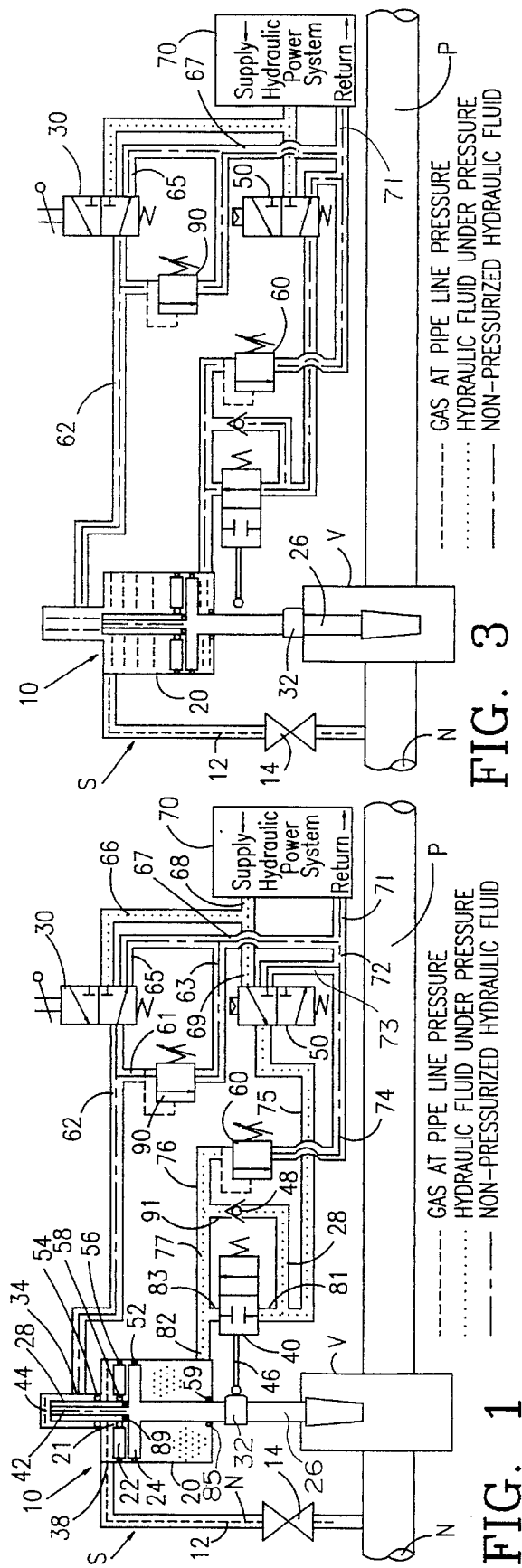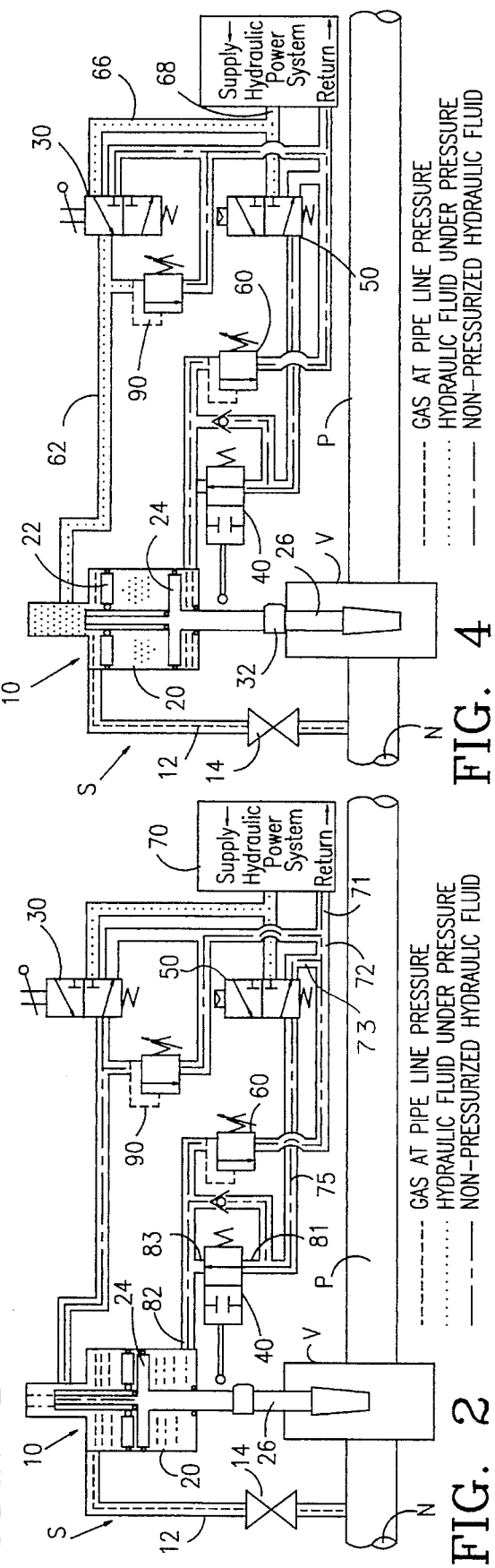

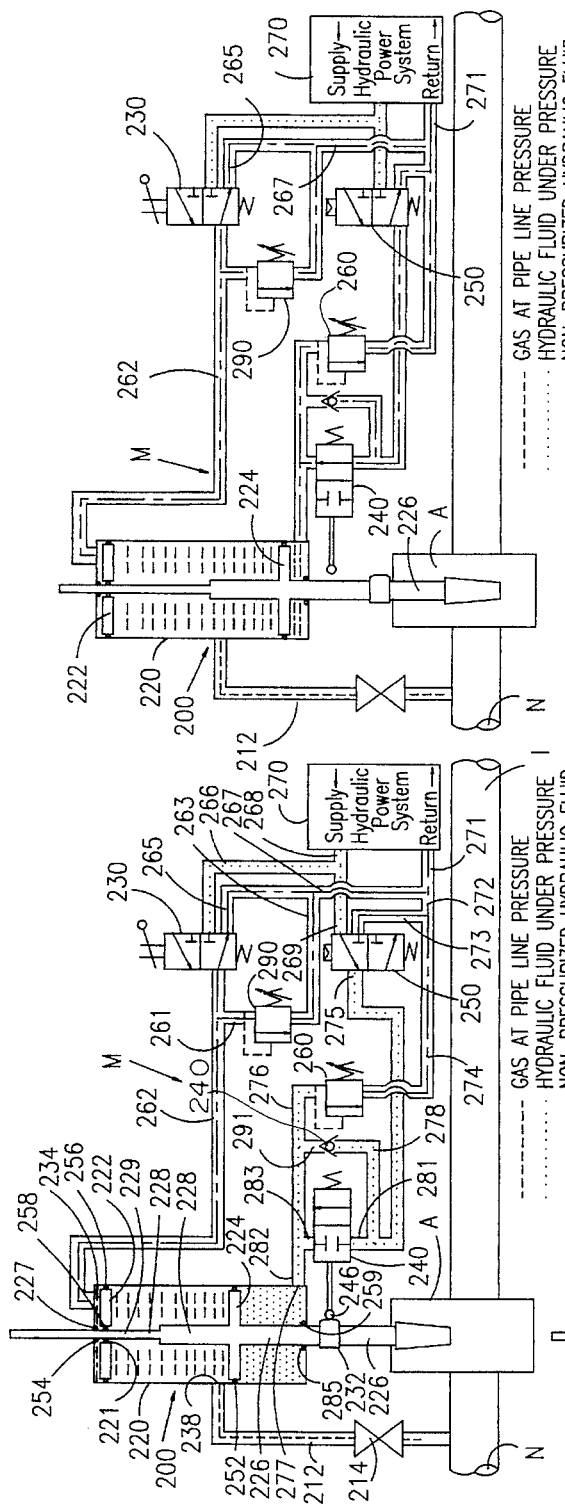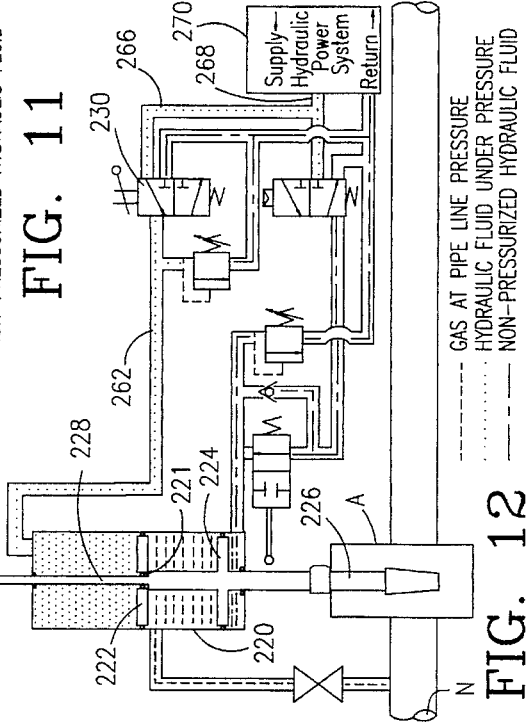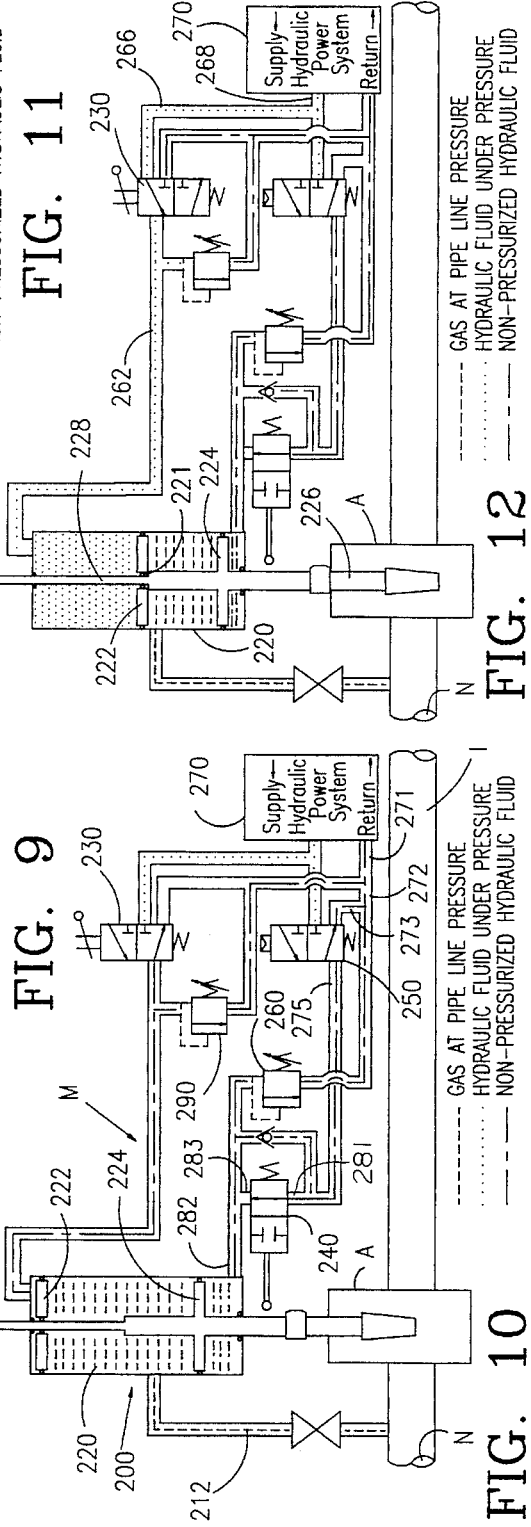

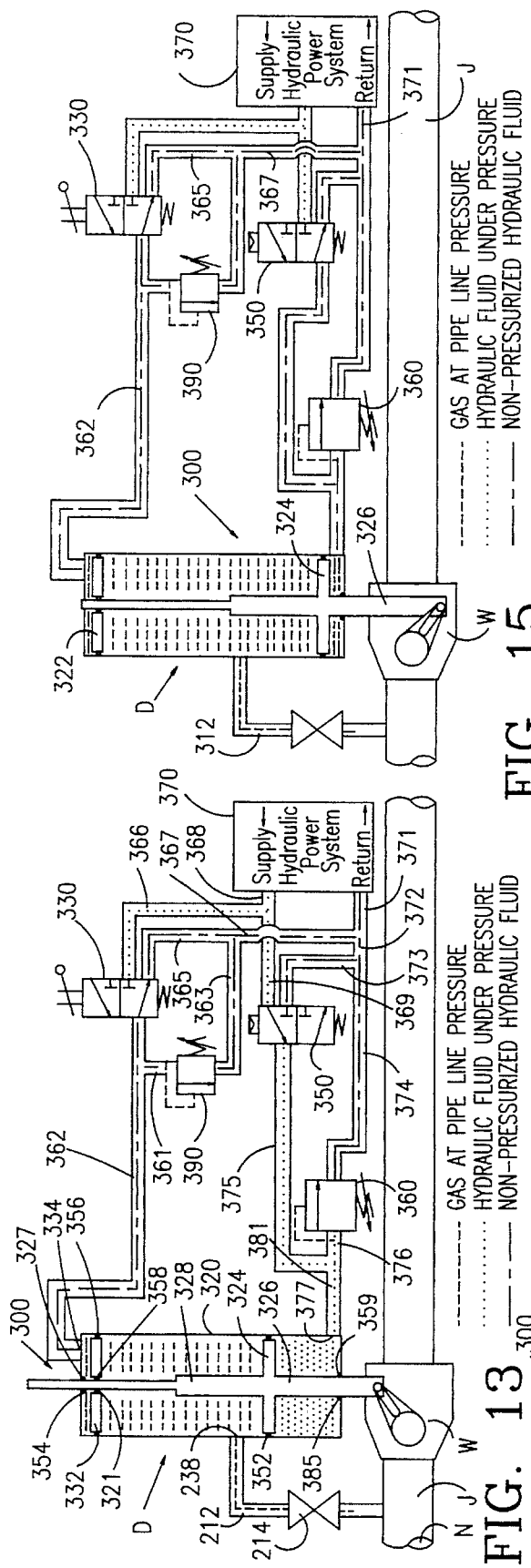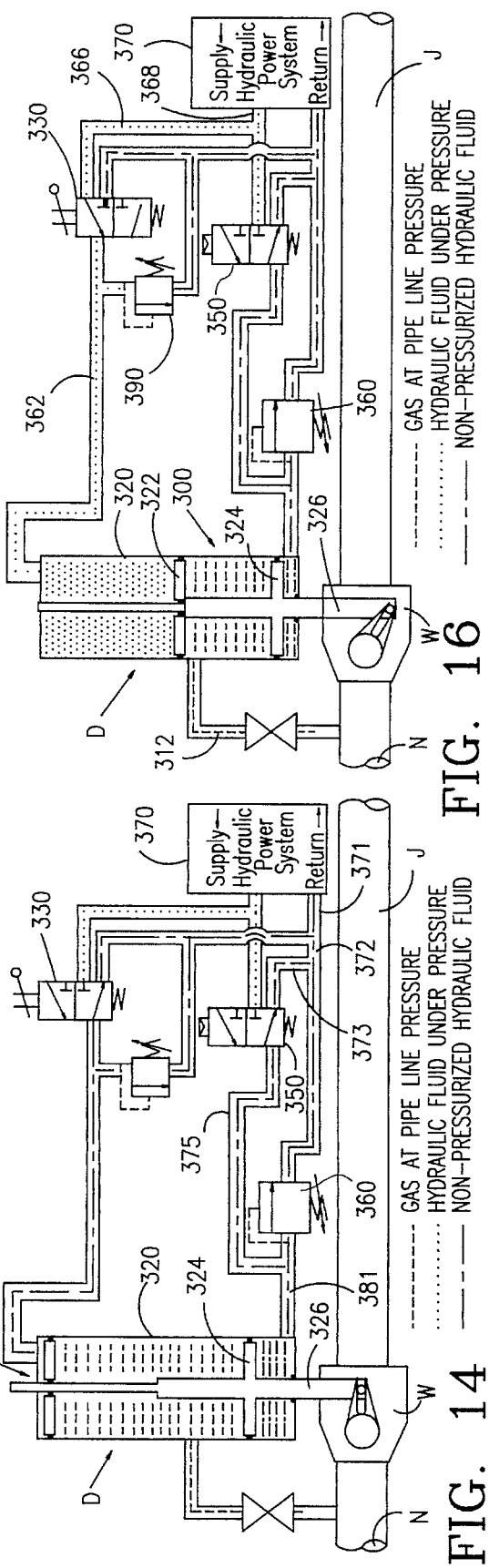
FIG. 13  FIG. 14  FIG. 15  FIG. 16

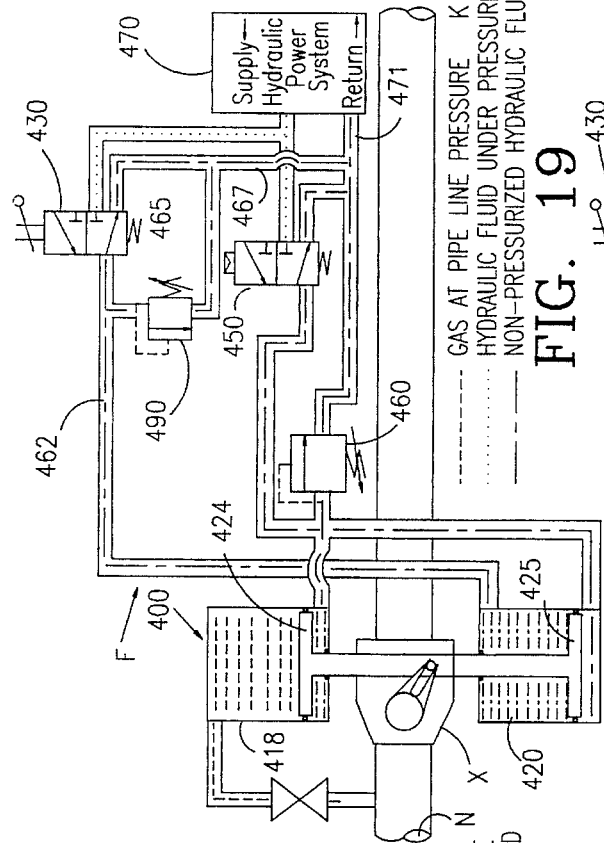
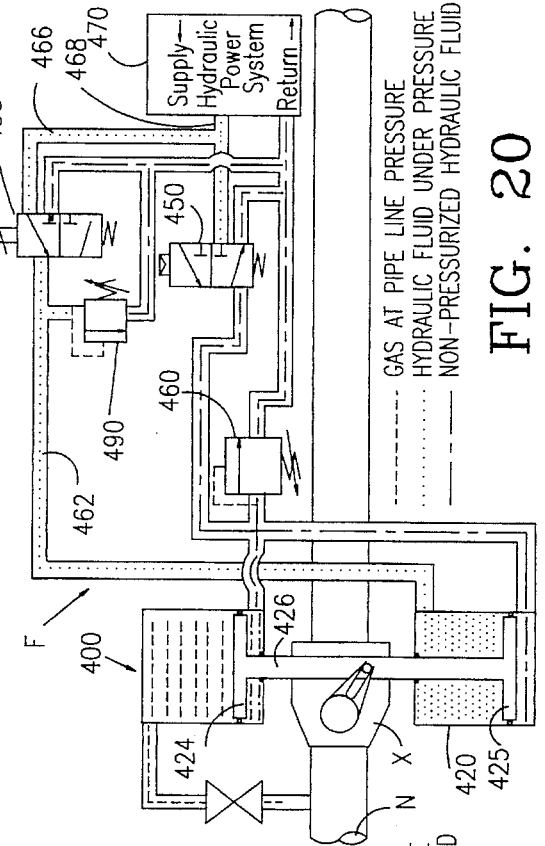
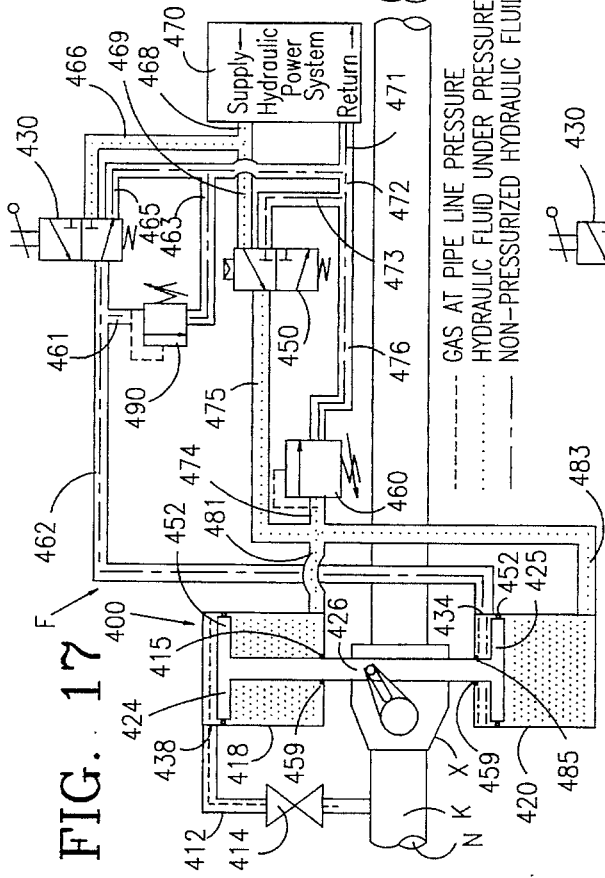
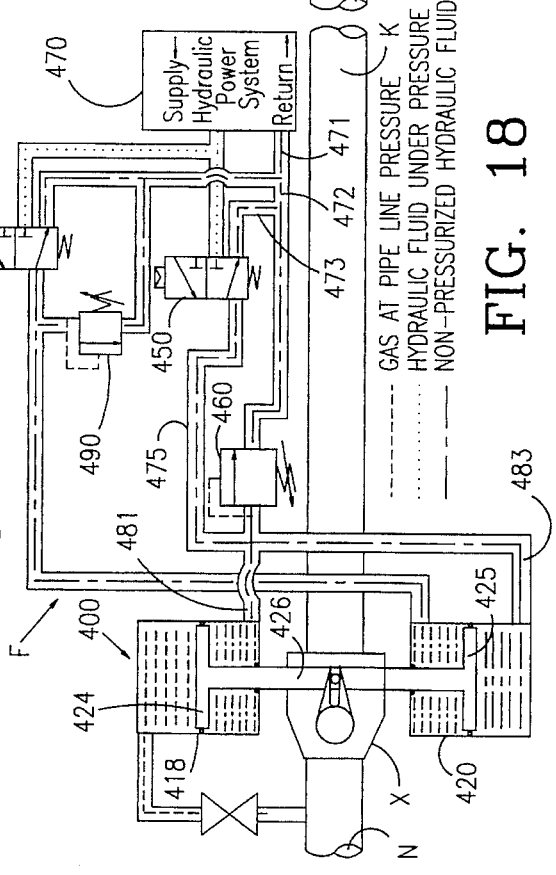

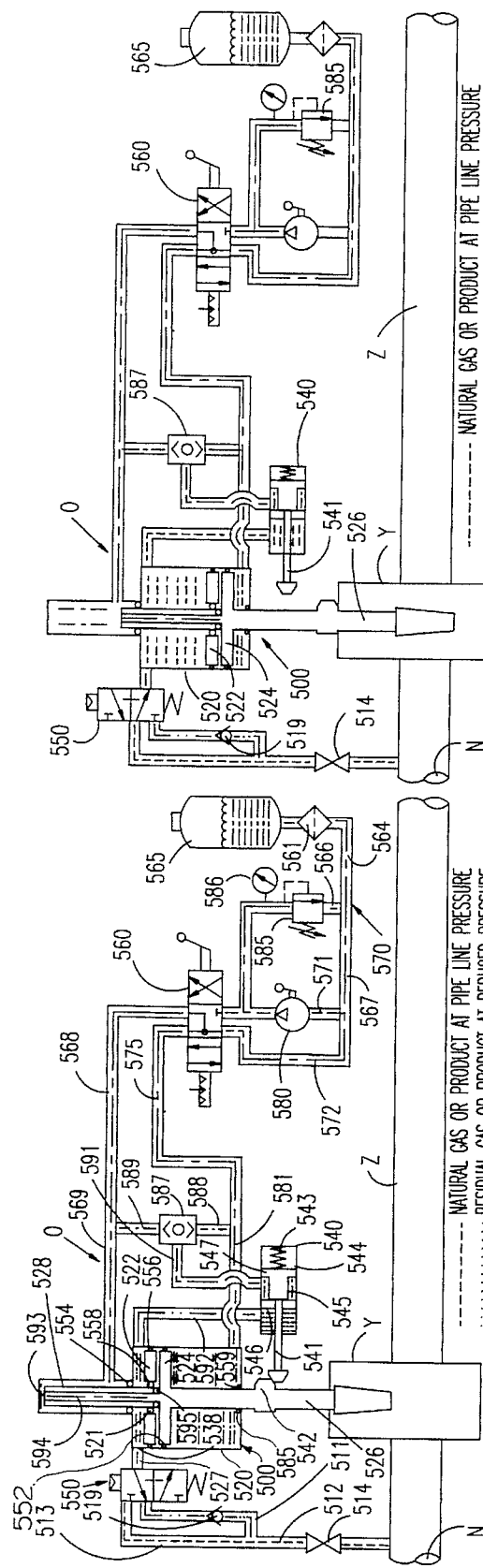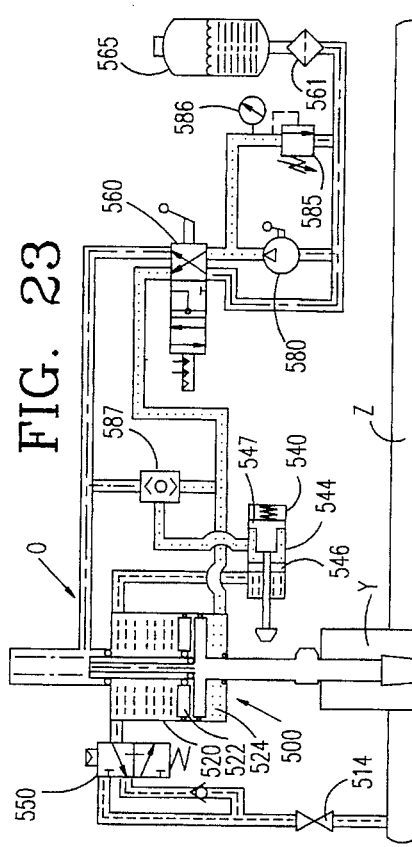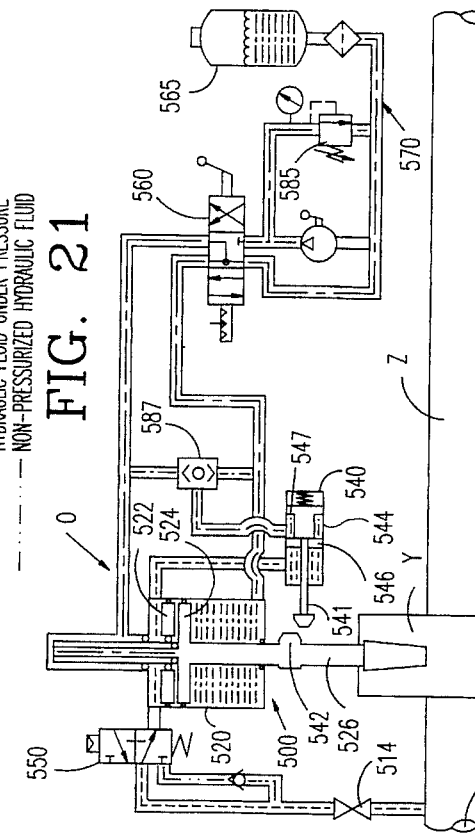

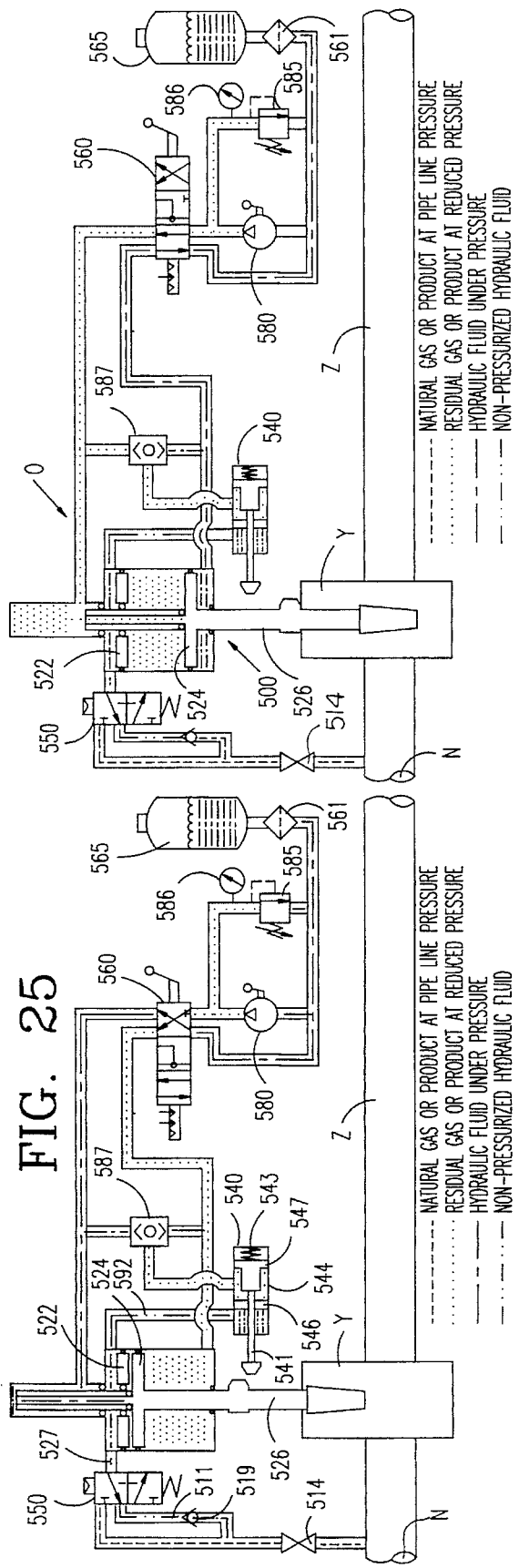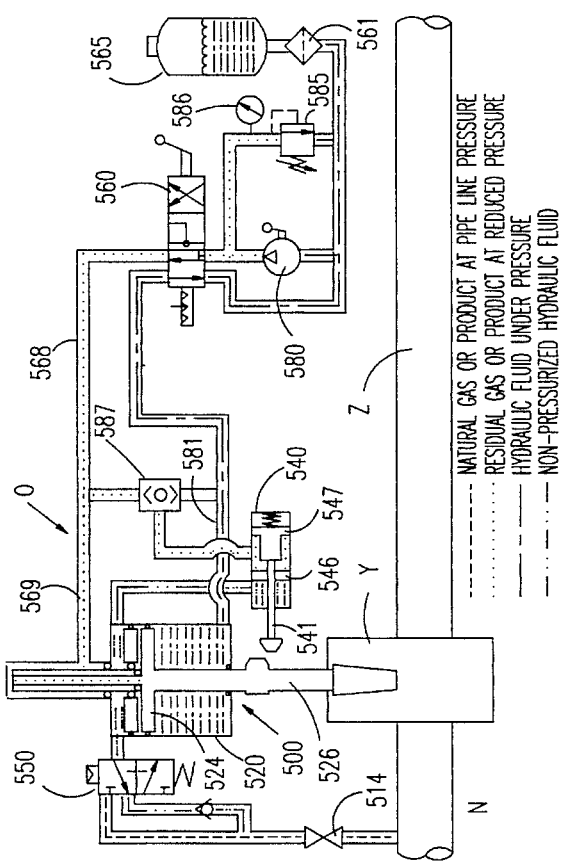

VALVE ACTUATOR

BACKGROUND OF THE INVENTION

1. Field of the Invention

This invention relates to valve actuators; to valve actuators for valves on gas and product pipelines; to such actuators with two pistons; to such actuators with a fixed piston and free-floating piston; and to such actuators whose use does not result in the discharge of gas or liquid to the environment.

2. Description of Related Art

The prior art discloses a variety of valve actuators, valve actuators for valves on gas pipelines, and hydraulic operating systems for pipeline valves. Certain prior art systems use a closed hydraulic circuit's pressure applied to a piston which operates against a spring. In the event of a pipeline leak or break, pressure against the spring is released and the spring closes a valve in the pipeline until the emergency situation can be corrected. Then the system is re-pressurized to open the valve.

One problem with such systems is that in their natural environment they are exposed to a wide range of ambient temperature fluctuations. In colder situations after the system is initially set, contraction of hydraulic fluid and the associated reduction in pressure on the operating spring can cause an undesirable valve drifting situation. As the ambient temperature increases, the expansion of fluid in the closed system can apply undue pressure on system components which can result in failure. To solve this problem, one prior art system has a relief valve so that when warmer conditions exist, expanded hydraulic fluid blows by the relief valve to prevent undue pressure from being placed on the operating spring.

In another prior art system a hydraulic accumulator is provided to receive excess hydraulic fluid upon thermal expansion. Such accumulators increase the expense of the system and present another problem encountered by the system with the relief valve; i.e., when the temperature decreases, hydraulic fluid in the accumulator cannot return to the actuator.

Another prior art system which does not exhaust fluid to the environment has a tank which holds a quantity of unpressurized hydraulic fluid and a pump that provides the fluid under pressure to a valve actuator. The valve actuator has an actuator cylinder with a piston which is operatively connected to the pipeline valve so that fluid under pressure moves the piston compressing a spring which opens the valve. When the piston ceases movement, continued pumping moves another piston of a smaller diameter than the first piston, which also acts against the spring. An indicator rod gives a visual indication of the position of the first piston and when it is at approximately its midstroke location, pumping of the fluid is terminated and the actuator is set. When ambient temperature conditions change, the second piston moves to accommodate such changes thereby leaving the first piston unaffected. When a pressure sensing valve senses a predetermined pressure change in the fluid in the pipeline, a dump valve is opened permitting the pressurized fluid in the system to be transferred back to the tank. The spring moves the first piston to close the pipeline valve. Although there is not intentional exhaust from this system to the environment, pressurized fluid in it can slowly leak down allowing the spring to close the pipeline valve.

Particularly in locations remote from pipeline compressor stations, valve actuators for pipeline valves are used which are powered by the pipeline fluid (gas or liquid). In normal circumstances this is a dependable source of power for such actuators. Other power sources, such as stored nitrogen, hydraulic fluid pressure or electrical power, are not considered to be as dependable a power source in an emergency situation, such as a break in the pipeline.

Certain prior art valve actuators use the pipeline natural gas to directly power a cylinder or a gas-over-oil system in which hydraulic fluid is pressurized by the gas. In such situations once the valve actuator has been positioned, the natural gas used to power the actuator is discharged through a relief valve, exhaust valve or control valve into the atmosphere where it may harm the environment.

There has long been a need for an efficient and effective valve actuator, particularly for valves on natural gas pipelines. There has long been a need for a device and a method to power pipeline valve actuators, especially in an emergency, without discharging natural gas into the atmosphere or other injurious material, such as hydraulic fluid onto the ground or into the atmosphere.

SUMMARY OF THE PRESENT INVENTION

The present invention, in one embodiment, teaches a valve actuator with a housing in which are movably disposed two pistons, each of which is interconnected with operation apparatus for closing a valve. Preferably one piston is a free floating piston and the other piston is secured to a rod which is connected to valve operation apparatus. Release of pressurized hydraulic fluid from beneath a bottommost piston secured to a rod connected to the valve results in valve closing. Fluid pressure on the topmost piston pushing down on the bottommost piston may also effect valve closing; the pressure supplied either by fluid from a flow line in which flow is controlled by the valve, or by pressurized hydraulic fluid supplied by an hydraulic fluid power supply and associated flow lines interconnecting it with the housing's interior. In one embodiment pressurized fluid applied on top of the bottom most piston results in closing the valve.

In one aspect such an actuator has an emergency shut down valve which has a pilot pressure supplied e.g. by the fluid pressure in the flow line in which fluid flow is controlled by the valve. A decrease in pressure of a set amount activates the emergency shut down valve, permitting fluid holding up the bottommost piston to exit the housing, resulting in downward movement of the bottommost piston and closure of the valve due to the weight of the bottommost piston and/or due to the force of pressurized fluid maintained in a space between the top of the free-floating topmost piston and the interior top of the housing. In one aspect this fluid is fluid from the conduit whose flow is controlled by the valve. If this fluid is gas, it acts like a pneumatic spring to close the valve when the higher pressure fluid beneath the bottommost piston is released.

In certain aspects the fluid in the flow line whose flow is controlled by the valve is gas and gas on top of either piston acts as a pneumatic spring which, once fluid pressure below a piston is reduced, acts to move a piston downwardly to close the valve. In certain aspects thermal relief valves are employed; one on the line(s) supplying hydraulic fluid above the pistons to relieve pressure in the event of excessive pressure build-up or due to any ambient temperature increase or the sun's heating effect on metal parts and one on the flow line(s) supplying hydraulic fluid beneath the pistons to relieve such pressure.

In certain embodiments in which the valve is a typical pipeline main valve, e.g. a gate valve, a holding valve is employed in flow lines through which pressurized hydraulic fluid is supplied beneath the bottommost piston to hold the piston and valve gate (weight) preventing piston movement until fluid is released from beneath the bottommost piston and pressure above it is increased.

In certain embodiments a control valve controls fluid flow in the line(s) through which pressurized hydraulic fluid is supplied to the top surface of one or both pistons to effect valve closure.

In certain embodiments the topmost piston freely floats above the bottommost piston. In one aspect the floating piston has a central hole through which extends a top rod secured to the bottommost piston. In one aspect the top rod has a top hole through which pressurized fluid is introduced into a central longitudinal channel of the top rod to flow out through one or more holes in the top rod into a space between the two pistons, forcing the bottommost piston downwardly; and, in one aspect in which a bottom rod is secured to the bottommost piston and the rod is secured to the valve's operating apparatus, the rod's downward movement effects valve closure. In certain embodiments with such a floating piston, the pressure of flow line fluid (fluid pressure of fluid—gas or liquid—in the flow line whose flow is controlled by the valve) applied on top of the floating piston pushes it down against the top of the bottommost piston and, when either this pressure is greater than the pressure of fluid below the bottommost piston or fluid is released from below the bottommost piston, the pressure of the flow line fluid on the pistons effects valve closure.

In certain embodiments a portion of the top rod extends out through the housing and has an intermediate shoulder against which the floating piston pushes to move the rod and thus the bottommost piston and its associated bottom rod downwardly. In certain embodiments with such a structure, flow line fluid is supplied between the two pistons to effect valve closure, pushing the floating piston up to the top of the housing and pushing the bottommost piston and thus the rod down to effect valve closure. The application of pressurized hydraulic fluid or gas into the housing (at a pressure greater than the pressure of fluid in the valve-controlled flow line) above the floating piston with release of the fluid beneath the bottommost piston also effects valve closure. A control valve controls the flow of pressurized fluid into the top of the housing.

In one aspect there is a latch system which releasably prevents rod movement and, therefore, valve closure.

In certain embodiments of an actuator according to this invention a movable rod is interconnected with operation apparatus for operating a valve on a flow line; e.g. a main line pipeline gate valve or a main line quarter turn ball and plug valve, the pipeline for transmitting natural gas (or liquid hydrocarbons). The rod extends into a top housing in which is movable a top piston secured to the rod, The rod also extends into a bottom housing in which is movable a bottom piston secured to the rod. In one aspect pressurized hydraulic fluid supplied by an intercommunicating hydraulic power system supplies pressurized hydraulic fluid into each housing below its associated piston holding the pistons up and preventing valve actuation. Release of the pressurized fluid from beneath the pistons by actuation of an emergency shut down valve results in pipeline valve closure. Such closure is facilitated by applying the pipeline natural gas under pressure on the top of the top piston and/or by applying pressurized hydraulic fluid on top of one of the pistons.

Preferred embodiments of valve actuators and actuator systems according to this invention are "closed" systems; i.e., throughout the system and the valve actuation process no material is expelled to the environment of the valve-controlled flow line and all activation fluids and pipeline fluids flow within and remain within their respective conduits or sub-systems.

Certain embodiments of this invention with two piston members as described in one housing have, in effect, three action chambers—one above the floating piston, one between the two pistons, and one below the piston secured to the rod. Thus the valve can be closed with either the force of pressurized fluid in the conduit whose flow is controlled by the valve or by pressurized fluid supplied to the system by a pressurized fluid source. In certain aspects the supplied pressurized fluid can be applied to the top of either piston to effect valve closure, while applying it between the pistons in one aspect moves the top piston to push conduit fluid from the housing and back into the conduit.

It is, therefore, an object of at least certain preferred embodiments of the present invention to provide:

New, useful, unique, efficient, nonobvious devices and methods for valve actuation, opening and closure and valve systems with such devices;

Such devices and methods with dual piston actuators with multiple effective chambers in a housing in which the pistons move and multiple choices for effecting closure of a valve on a conduit actuated by the devices which, in one aspect, include a free floating piston in the housing above a piston fixed to a rod which is interconnected with operating apparatus for operating the valve;

Such devices with dual housings and a piston in each housing;

Such devices in which the force of pressurized gaseous fluid from the conduit applied to the top of a topmost free-floating piston acts as a pneumatic spring to close a valve interconnected with a rod against which the topmost piston moves (or the topmost piston moves to abut a bottommost piston secured to the rod) when pressurized fluid below the topmost piston from a source other than the conduit is released; and Such devices and methods which result in the expelling of no undesirable materials into the environment.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1 is a schematic view of a valve actuator system according to the present invention with part of an actuator shown in cross-section. FIGS. 2–4 show steps in the operation of the system of FIG. 1.

FIG. 9 is a schematic view of a valve actuator system according to the present invention with part of an actuator shown in cross-section. FIGS. 10–12 show steps in the operation of the system of FIG. 9.

FIG. 13 is a schematic view of a valve actuator system according to the present invention with part of an actuator shown in cross-section, FIGS. 14–16 show steps in the operation of the system of FIG. 13, FIG. 17 is a schematic view of a valve actuator system according to the present invention with part of an actuator shown in cross-section. FIGS. 18–20 show steps in the operation of the system of FIG. 17.

FIG. 21 is a schematic view of a valve actuator system according to the present invention with part of an actuator shown in cross-section. FIGS. 2214 27 show steps in the operation of the system of FIG. 21.

DESCRIPTION OF EMBODIMENTS PREFERRED AT THE TIME OF FILING FOR THIS PATENT

Figure 5:
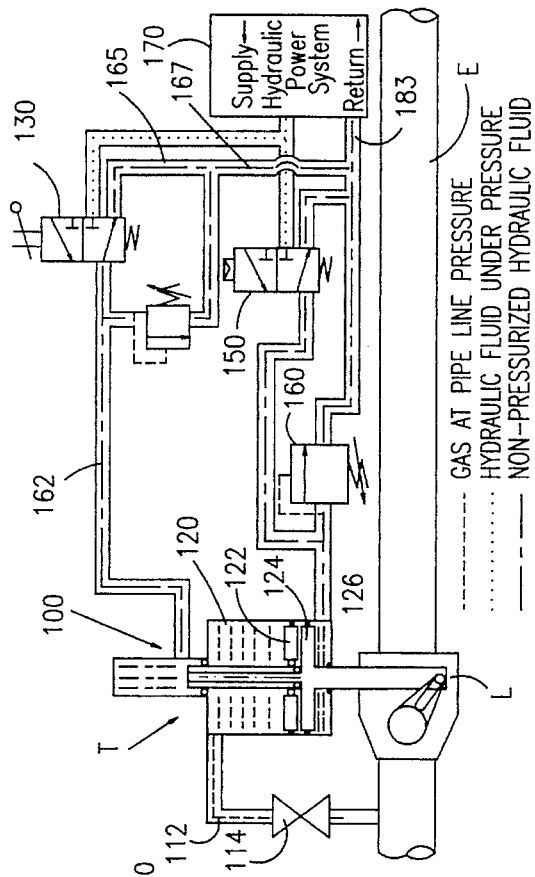
FIG. 5 is a schematic view of a valve actuator system according to the present invention with part of an actuator shown in cross-section.

Referring now to FIG. 1, FIG. 1 illustrates a valve actuator system S and a valve actuator 10 according to the present invention. The valve actuator 10 has a housing 20 in which are movably mounted a fixed rod piston 24 and a floating piston 22. The fixed rod piston 24 is secured to or formed integrally of a bottom rod 26 which extends through a hole 85 in the housing 20. A seal 59 seals the hole-rod interface. The bottom rod 26 is secured to operating apparatus (not shown) of a pipeline valve V (e.g. a typical gate valve) which controls fluid flow in a pipeline P through which flows fluid (e.g. but not limited to natural gas or crude oil) such as natural gas N. A seal 52 seals the rod piston-housing interface.

The floating piston 22 has a central hole 21 through which extends a top rod 28 which is secured to or formed integrally of the fixed rod piston 24. A seal 58 seals the piston-top rod interface and a seal 56 seals the piston-housing interface. A seal 54 seals the top rod-housing interface.

Pipeline fluid, e.g. natural gas, is supplied into the housing 20 through a fluid flow line 12 and enters the housing 20 through a fluid entry port 38. An isolation valve 14 controls fluid flow in the fluid flow line 12.

As shown in FIG. 1, pressurized hydraulic fluid at a pressure higher than that of the pipeline fluid (e.g. 1500 p.s.i. vs. 1000 p.s.i.) supplied by an hydraulic power system 70 through flow lines 68, 69, 75, 81, 82, and 83 acting against the bottom of the rod piston 24 holds the pipeline valve V open. Natural gas at typical pipeline pressure acts on the top of the floating piston 22, the gas acting as a pneumatic spring on the top of the floating piston 22. As shown in FIG. 1, the pressurized hydraulic fluid flows through the fluid flow line 69, through an emergency shut down valve 50, and then to the flow line 75. The emergency shut down valve is, preferably, controllable in a variety of ways including manual control, solenoid control, pneumatic control, etc. The valve 50 as shown in FIG. 1 has a pilot pressure from the emergency control system supplied to it.

The floating piston 22 is controlled by a control valve 30 which controls the flow of pressurized hydraulic fluid in the lines 62, 65, and 66. This fluid enters the housing 20 through a fluid port 34 and moves through a top rod hole 44 in the top rod 28, through a central channel 42 of the top rod 28, out through exit holes 89 in the top rod 28, and into space between the floating piston 22 and the rod piston 24.

A thermal relief valve 90 in fluid communication with the flow lines 61 and 63 provides thermal relief, e.g. in the event that excess pressure builds up due to a temperature increase. A thermal relief valve 60 in the fluid communication with the flow lines 74 and 76 provides thermal relief in such circumstances. A check valve 48 in fluid communication with the flow lines 78 and 91 serves to allow fluid flow when the emergency shut down valve operates, A holding valve 40 in fluid communication with the fluid flow lines 81 and 83 has a cam holding device 46 which holds the cam 32 of the bottom rod 26. In a normal situation the cam holding device 46 is held against the cam 32 and the bottom rod 26 cannot move. Pressure on the piston forces the rod down, moving the cam holding device 46 and thereby activates the valve 40.

As shown in FIG. 2, loss of emergency shut down pressure (e.g. due to a pipeline break or a remote control signal) results in the re-positioning of the emergency shut down valve 50 so that pressurized hydraulic fluid is no longer supplied to the bottom side of the rod piston 24 and the control valve 30 is positioned as in FIG. 1 to prevent the supply of pressurized hydraulic fluid to the top of the floating piston. Fluid beneath the rod piston 24 can now exit the system via the flow lines 82, 83, 81, 75, 73, 72, and 71, and does so under the force of the natural gas from the pipeline acting as a pneumatic spring on the top of the two pistons. The check valve 48 provides a flow path for fluid around the holding valve 40. The force of the natural gas from the pipeline moves the two pistons and the bottom rod 26 downwardly to close the valve V.

As shown in FIG. 3, the valve V has been closed so that fluid does not flow from one side of the valve V to the other in the pipeline P. The valve V can be reopened by supplying pressure to the pilot sensor part of the emergency shut down valve 50. As shown in FIGS. 1–3 non-pressurized hydraulic fluid is supplied through the control valve 30 to the space between the two pistons and is allowed to exit the system through the flow lines 62, 65, 67 and 71.

As shown in FIG. 4, the pipeline valve V can also be closed by supplying pressurized hydraulic fluid to the space between the two pistons, forcing them apart and closing the valve V. The hydraulic power system 70 supplies hydraulic fluid under pressure to the control valve 30 at a pressure greater than the pressure of the pipeline fluid. Operation of the control valve 30 permits the pressurized hydraulic fluid to flow from lines 68 and 66 into the line 62, and thence into the space between the floating piston 22 and the rod piston 24. As shown in FIG. 4 the floating piston 22 has been forced upwardly in the housing 20, pushing natural gas N from the housing 20; and the rod piston 24 has been forced downwardly in the housing, moving the bottom rod 26 downwardly and closing the valve V. The hydraulic power system 70 includes but is not limited to systems that supply pressurized hydraulic fluid in a number of different ways; e.g. hand pump, air motor/hydraulic pump, stored nitrogen, electric motor/hydraulic pump, gasoline engine/hydraulic pump, and photovoltaic powered electrical motor/pump.

Referring now to FIG. 5, a valve actuator system T and a valve actuator 100 according to the present invention. The valve actuator 100 has a housing 120 in which are movably mounted a fixed rod piston 124 and a floating piston 122. The fixed rod piston 124 is secured to or formed integrally of a bottom rod 126 which extends through a hole 185 in the housing 120. A seal 159 seals the hole-rod interface. The bottom rod 126 is secured to operating apparatus (not shown) of a pipeline valve L (e.g. a typical mainline quarter turn valve) which controls fluid flow in a pipeline E through which flows fluid (e.g. but not limited to natural gas and oil) such as natural gas N. A seal 152 seals the rod piston-housing interface. The floating piston 122 has a central hole 121 through which extends a top rod 128 which is secured to or formed integrally of the fixed rod piston 124. A seal 158 seals the piston-top rod interface and a seal 156 seals the piston-housing interface. A seal 154 seals the top rod-housing interface. Pipeline fluid, e.g. natural gas, is supplied into the housing 120 through a fluid flow line 112 and enters the housing 120 through a fluid entry port 138. An isolation valve 114 controls fluid flow in the fluid flow line 112.

As shown in FIG. 5, pressurized hydraulic fluid supplied by an hydraulic power system 170 through flow lines 168, 169, 175, and 181 acting against the bottom of the rod piston 124 holds the pipeline valve L open. Natural gas at typical pipeline pressure acts on the top of the floating piston 122. (which is in contact with the rod piston 124), the gas acting as a pneumatic spring on the top of the floating piston 122. As shown in FIG. 5, the pressurized hydraulic fluid flows through the fluid flow line 169, through an emergency shut down valve 150, and then to the flow line 175. The emergency shut down valve 150 is, preferably, controllable in a variety of ways including manual, solenoid, pneumatic, etc. The valve 150 as shown in FIG. 5 has a pilot pressure from the emergency control system supplied to it.

The floating piston 122 is controlled by a control valve 130 which controls the flow of pressurized hydraulic fluid in the lines 162, 765, and 166. This fluid enters the housing 120 through a fluid port 134 and moves through a top rod hole 144 in the top rod 128, through a central channel 142 of the top rod 128, out through exit holes 189 in the top rod 128, and into space between the floating piston 122 and the rod piston 124.

A thermal relief valve 190 in fluid communication with the flow lines 161 and 163 provides thermal relief, e.g. in the event of undesired pressure build-up or heating effects of the sun. A thermal relief valve 160 in the fluid communication with the flow lines 181, 174, 175, and 191 provides thermal relief, e.g. in such circumstances.

Figure 6:
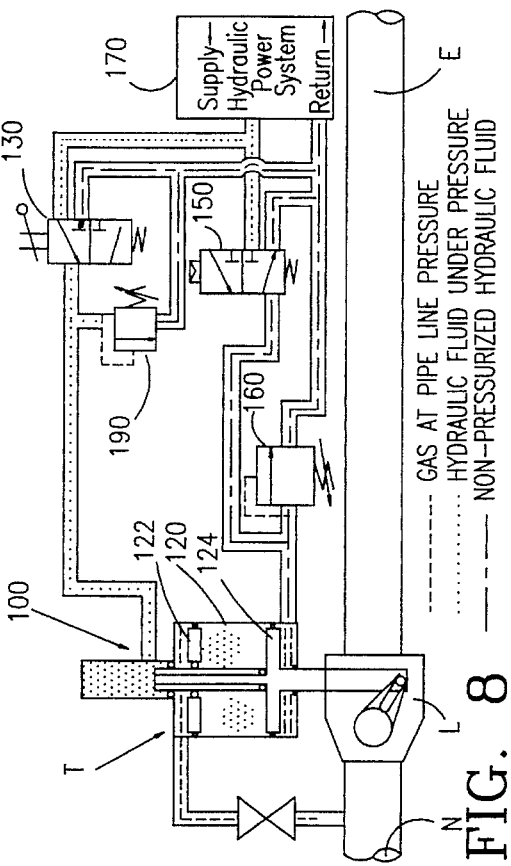
FIGS. 6–8 show steps in the operation of the system of FIG. 5.

As shown in FIG. 6, loss of emergency shut down pressure results in the re-positioning of the emergency shut down valve 150 so that pressurized hydraulic fluid is no longer supplied to the bottom side of the rod piston 124 and the control valve 730 is 130 positioned as in FIG. 5 to prevent the supply of pressurized hydraulic fluid to the top of the floating piston. Fluid beneath the rod piston 124 can now exit the system via the flow lines 181, 191, 174, 182 and 183, and does so under the force of the natural gas from the pipeline on the top of the two pistons. The force of the natural gas from the pipeline moves the two pistons and the bottom rod 126 downwardly to close the valve L.

Figure 7:
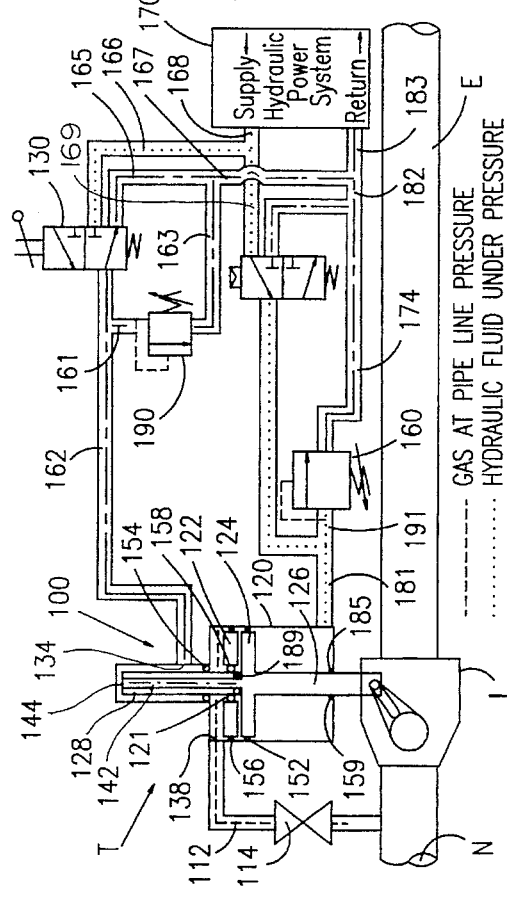

As shown in FIG. 7, the valve L has been closed so that fluid does not flow from one side of the valve L to the other in the pipeline E. The valve L can be reopened by supplying pressure to the pilot sensor part of the emergency shut down valve 150. As shown in FIGS. 5–7 non-pressurized hydraulic fluid is supplied through the control valve 130 to the space between the two pistons and is allowed to exit the system through the flow lines 162, 165, 167 and 183.

Figure 8:
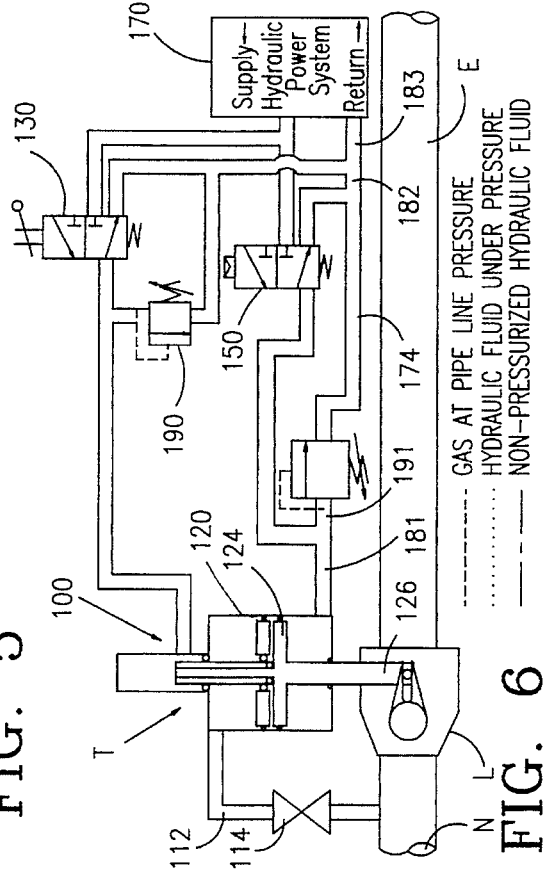

As shown in FIG. 8, the pipeline valve L can also be closed by supplying pressurized hydraulic fluid to the space between the two pistons, forcing them apart and closing the valve L. The hydraulic power system 170 supplies hydraulic fluid under pressure to the control valve 130. Operation of the control valve 130 permits the pressurized hydraulic fluid to flow into the space between the floating piston 122 and the rod piston 124. As shown in FIG. 8 the floating piston 122 has been forced upwardly in the housing 120, pushing natural gas from the housing 120; and the rod piston 124 has been forced downwardly in the housing, moving the bottom rod 126 downwardly and closing the valve L. The hydraulic power system 170 includes but is not limited to systems that supply pressurized hydraulic fluid in a number of different ways; e.g. hand pump, air motor/hydraulic pump, stored nitrogen, electric motor/hydraulic pump, gasoline engine/hydraulic pump, and photovoltaic powered electric motor/pump.

Referring now to FIG. 9, a valve actuator system M and a valve actuator 200 according to the present invention has a housing 220 in which are movably mounted a fixed rod piston 224 and a floating piston 222. The fixed rod piston 224 is secured to or formed integrally of a bottom rod 226 which extends through a hole 285 in the housing 220. A seal 259 seals the hole-rod interface. The bottom rod 226 is secured to operating apparatus (not shown) of a pipeline valve A (e.g. a typical gate valve) which controls fluid flow in a pipeline I through which flows fluid (e.g. but not limited to natural gas and oil) such as natural gas N. A seal 252 seals the rod piston-housing interface.

The floating piston 222 has a central hole 221 through which extends a narrow portion 229 of a top rod 228 which is secured to or formed integrally of the fixed rod piston 224. A seal 258 seals the piston-top rod interface and a seal 256 seals the piston-housing interface. A seal 254 seals the top rod-housing interface. Part of the narrow portion 229 extends out from the housing 220 through a hole 227.

Pipeline fluid, e.g. natural gas, is supplied into the housing 220 through a fluid flow line 212 and enters the housing 220 through a fluid entry port 238. An isolation valve 214 controls fluid flow in the fluid flow line 212.

As shown in FIG. 9, pressurized hydraulic fluid supplied by an hydraulic power system 270 through flow lines 268, 269, 275, 281, 282, and 283 acting against the bottom of the rod piston 224 holds the pipeline valve A open. Natural gas at typical pipeline pressure acts on the bottom of the floating piston 222 holding it up in the housing 220 and the force of the gas acts as a pneumatic spring on the top of the fixed rod piston 224. As shown in FIG. 9, the pressurized hydraulic fluid flows through the fluid flow line 269, through an emergency shut down valve 250, and then to the flow line 275 (for supply into the housing 220 through an inlet port 277 via the flow lines 281, 283, and 282 and through the control valve 240). The emergency shut down valve 250 is, preferably, controllable in a variety of ways including manual, solenoid, pneumatic, etc. The valve 250 as shown in FIG. 9 has a pilot pressure from the emergency control system supplied to it.

The floating piston 222 is controlled by a control valve 230 which controls the flow of pressurized hydraulic fluid in the lines 262, 265, and 266. This fluid enters the housing 220 through a fluid port 234, and into space between the top of the floating piston 222 and the top of the housing 220.

A thermal relief valve 290 in fluid communication with the flow lines 261 and 263 provides thermal relief, e.g. in the event of undesired pressure build-up or heating effects of the sun. A thermal relief valve 260 in the fluid communication with the flow lines 274 and 276 provides thermal relief in such circumstances. A check valve 248 in fluid communication with the flow lines 278 and 291 allows fluid to flow around the holding valve 240.

A holding valve 240 in fluid communication with the fluid flow lines 281 and 283 has a cam holding device 246 which holds a cam 232 of the bottom rod 226. In a normal situation the cam holding device 246 is held against the cam 232 and the bottom rod 226 cannot move.

As shown in FIG. 10, loss of emergency shut down pressure results in the re-positioning of the emergency shut down valve 250 so that pressurized hydraulic fluid is no longer supplied to the bottom side of the rod piston 224 and the control valve 230 is positioned as in FIG. 9 to prevent the supply of pressurized hydraulic fluid to the top of the floating piston. Fluid beneath the rod piston 224 can now exit the system via the flow lines 282, 283, 281, 275, 273, 272, and 271, and does so under the force of the natural gas from the pipeline on the top of the fixed rod piston 224. The force of the natural gas from the pipeline moves the fixed rod piston 224 and the bottom rod 226 downwardly to close the valve A.

As shown in FIG. 11, the valve A has been closed so that fluid does not flow from one side of the valve A to the other in the pipeline I. The valve A can be reopened by supplying pressure to the pilot sensor part of the emergency shut down valve 250. As shown in FIGS. 9–11 non-pressurized hydraulic fluid is supplied through the control valve 230 to the space between the floating piston and the top of the housing and is allowed to exit the system through the flow lines 262, 265, 267 and 271.

As shown in FIG. 12, the pipeline valve A can also be closed by supplying pressurized hydraulic fluid to the space between the two pistons, forcing the floating piston 222 down to contact a shoulder 224 on the top rod 228 and thus forcing the fixed rod piston 224 and the bottom rod 226 downwardly to close the valve A. The hydraulic power system 270 supplies hydraulic fluid under pressure to the control valve 230. Operation of the control valve 230 permits the pressurized hydraulic fluid to flow from lines 268 and 266 into the line 262, and thence into the space between the floating piston 222 and the top of the housing 220. As shown in FIG. 12 the floating piston 222 has been forced downwardly in the housing 220, pushing natural gas N from the housing 220; and the rod piston 224 has been forced downwardly in the housing, moving the bottom rod 226 downwardly and closing the valve A. The hydraulic power system 270 includes but is not limited to systems that supply pressurized hydraulic fluid in a number of different ways; e.g. hand pump, air motor/hydraulic pump, stored nitrogen, electric motor/hydraulic pump, gasoline engine/hydraulic pump, and photovoltaic powered electric motor/pump.

Referring now to FIG. 13, illustrates a valve actuator system D and a valve actuator 300 according to the present invention. The valve actuator 300 has a housing 320 in which are movably mounted a fixed rod piston 324 and a floating piston 322. The fixed rod piston 324 is secured to or formed integrally of a bottom rod 326 which extends through a hole 385 in the housing 320. A seal 359 seals the hole-rod interface. The bottom rod 326 is secured to operating apparatus (not shown) of a pipeline valve W (e.g. a typical mainline quarter turn ball and plug valve) which controls fluid flow in a pipeline J through which flows fluid (e.g. but not limited to natural gas and oil) such as natural gas N. A seal 352 seals the rod piston-housing interface.

The floating piston 322 has a central hole 321 through which extends a narrow portion 329 of a top rod 328 which is secured to or formed integrally of the fixed rod piston 324. A seal 358 seals the piston-top rod interface and a seal 356 seals the piston-housing interface. A seal 354 seals the top rod-housing interface. Part of the narrow portion 329 extends outside the housing 320 through a hole 327.

Pipeline fluid, e.g. natural gas, is supplied into the housing 320 through a fluid flow line 312 and enters the housing 320 through a fluid entry port 338. An isolation valve 314 controls fluid flow in the fluid flow line 312.

As shown in FIG. 13, pressurized hydraulic fluid supplied by an hydraulic power system 370 through flow lines 368, 369, 375, and 381 acting against the bottom of the rod piston 324 holds the pipeline valve W open. Natural gas at typical pipeline pressure acts on the bottom of the floating piston 322 holding it up in the housing 320 and the force of the gas acts as a pneumatic spring on the top of the fixed rod piston 324. As shown in FIG. 13, the pressurized hydraulic fluid flows through the fluid flow line 369, through an emergency shut down valve 350, and then to the flow lines 375 and 381 (for supply into the housing 320 through an inlet port 377). The emergency shut down valve 350 is, preferably, controllable in a variety of ways including manual, solenoid, pneumatic, etc. The valve 350 as shown in FIG. 13 has a pilot pressure from the emergency shut down system supplied to it.

The floating piston 322 is controlled by a control valve 330 which controls the flow of pressurized hydraulic fluid in the lines 362, 365, and 366. This fluid enters the housing 320 through a fluid port 334 and moves and into space between the floating pistons 322 and the top interior of the housing 320.

A thermal relief valve 390 in fluid communication with the flow lines 361 and 363 provides thermal relief, e.g. in the event of undesired pressure build-up or heating effects of the sun. A thermal relief valve 360 in the fluid communication with the flow lines 374 and 376 provides thermal relief, e.g. in such circumstances.

As shown in FIG. 14, loss of emergency shut down pressure results in the re-positioning of the emergency shut down valve 350 so that pressurized hydraulic fluid is no longer supplied to the bottom side of the rod piston 324 and the control valve 330 is positioned as in FIG. 14 to prevent the supply of pressurized hydraulic fluid to the top of the floating piston. Fluid beneath the rod piston 324 can now exit the system via the flow lines 381, 375, 373, 372, and 371, and does so under the force of the natural gas from the pipeline on the top of the fixed rod pistons 324. The force of the natural gas from the pipeline moves the fixed rod piston 324 and the bottom rod 326 downwardly to close the valve W.

As shown in FIG. 15, the valve W has been closed so that fluid does not flow from one side of the valve W to the other in the pipeline J. The valve W can be reopened by supplying pressurized hydraulic fluid to the pilot sensor part of the emergency shut down valve 350. As shown in FIGS. 13–15 non-pressurized hydraulic fluid is supplied through the control valve 330 to the space between the floating piston and the top of the housing and is allowed to exit the system through the flow lines 362, 365, 367 and 371.

As shown in FIG. 16, the pipeline valve W can also be closed by supplying pressurized hydraulic fluid to the space between the floating piston 322 and the top of the housing 320, forcing them apart and closing the valve W. The hydraulic power system 370 supplies hydraulic fluid under pressure to the control valve 330. Operation of the control valve 330 permits the pressurized hydraulic fluid to flow from lines 368 and 366 into the line 362, and thence into the space between the floating piston 322 and the interior top of the housing 320. As shown in FIG. 16 the floating piston 322 has been forced downwardly in the housing 320, pushing natural gas N from the housing 320; and the rod piston 324 has been forced downwardly in the housing, moving the bottom rod 326 downwardly and closing the valve W. The hydraulic power system 370 includes but is not limited to systems that supply pressurized hydraulic fluid in a number of different ways; e.g. hand pump, air motor/hydraulic pump, stored nitrogen, electric motor/hydraulic pump, gasoline engine/hydraulic pump, and photovoltaic powered electric motor/pump.

FIG. 17 illustrates a valve actuator system F and a valve actuator 400 according to the present invention. The valve actuator 400 has two housings 418 and 420 in which are movably mounted fixed rod piston 424 and 425. The fixed rod pistons 424 and 425 are secured to or formed integrally of a rod 426 which extends through hole 485 and 415 in the housing 420. Seals 459 seal the hole-rod interfaces. The rod 426 is secured to operating apparatus 402 of a pipeline valve X (e.g. a typical mainline quarter turn ball and plug valve) which controls fluid flow in a pipeline K through which flows fluid (e.g. but not limited to natural gas and oil) such as natural gas N. Seals 452 seal the rod piston-housing interfaces.

Pipeline fluid, e.g. natural gas, is supplied into the housing 418 through a fluid flow line 412 and enters the housing 418 through a fluid entry port 438. An isolation valve 414 controls fluid flow in the fluid flow line 412.

As shown in FIG. 17, pressurized hydraulic fluid supplied by an hydraulic power system 470 through flow lines 468, 469, 475, and 483 acting against the bottom of the rod piston 425 and through flow lines 481 acting against the bottom of the piston 424 holds the pipeline valve X open. Natural gas a typical pipeline pressure acts on the top of the piston 424, the gas acting as a pneumatic spring on the top of the piston 424. As shown in FIG. 17, the pressurized hydraulic fluid flows through the fluid flow line 469, through an emergency shut down valve 450, and then to the flow lines 475, 481, and 483. The emergency shut down valve 450 is, preferably, controllable in a variety of ways including manual, solenoid, pneumatic, etc. The valve 450 as shown in FIG. 17 has a pilot pressure from the emergency shut down system supplied to it.

The piston 425 is controlled by a control valve 430 which controls the flow of pressurized hydraulic fluid in the lines 462, 465, and 466. This fluid enters the housing 420 through a fluid port 434 and into space between the piston 425 and the top interior of the housing 420.

A thermal relief valve 490 in fluid communication with the flow lines 461 and 463 provides thermal relief, e.g. in the event of undesired pressure build-up or solar heat effects. A thermal relief valve 460 in the fluid communication with the flow lines 474 and 476 provides thermal relief, e.g. in such circumstances.

As shown in FIG. 18, loss of emergency shut down pilot pressure results in the re-positioning of the emergency shut down valve 450 so that pressurized hydraulic fluid is no longer supplied to the bottom side of the pistons and the control valve 430 is positioned as in FIG. 17 to prevent the supply of pressurized hydraulic fluid to the top of the piston 425. Fluid beneath the pistons can now exit the system via the flow lines 483, 481, 475, 473, 472, and 471, and does so under the force of the natural gas from the pipeline on the top of the piston 424. The force of the natural gas from the pipeline moves the two pistons and the rod 426 downwardly to close the valve X.

As shown in FIG. 19, the valve X has been closed so that fluid does not flow from one side of the valve X to the other in the pipeline K. The valve X can be reopened by supplying pressurized hydraulic fluid to the pilot sensor part of the emergency shut down valve 450. As shown in FIGS. 17–19 hydraulic fluid is supplied through the control valve 430 to the space between the piston 425 and the interior top of the housing 420 and is allowed to exit the system through the flow lines 462, 465, 467 and 471.

As shown in FIG. 20, the pipeline valve X can also be closed by supplying pressurized hydraulic fluid to the space between the piston 425 and the interior top of the housing 420, forcing the piston 425 downwardly and closing the valve X. The hydraulic power system 470 supplies hydraulic fluid under pressure to the control valve 430. Operation of the control valve 430 permits the pressurized hydraulic fluid to flow from lines 468 and 466 into the line 462, and thence into the space between the piston 425 and the top of the housing 420. As shown in FIG. 20 the piston 425 has been forced downwardly in the housing, moving the rod 426 downwardly and closing the valve X. The hydraulic power system 470 includes but is not limited to systems that supply pressurized hydraulic fluid in a number of different ways; e.g. hand pump, air motor/hydraulic pump, stored nitrogen, electric motor/hydraulic pump, gasoline engine/hydraulic pump, and photovoltaic powered electric motor/pump.

Referring now to FIG. 21, a valve actuator system O and a valve actuator 500 according to the present invention has a housing 520 in which are movably mounted a fixed rod piston 524 and a floating piston 522. The fixed rod piston 524 is secured to or formed integrally of a bottom rod 526 which extends through a hole 585 in the housing 520. A seal 559 seals the hole-rod interface. The bottom rod 526 is secured to operating apparatus (not shown) of a pipeline valve Y (e.g. a typical pipeline gate valve) which controls fluid flow in a pipeline Z through which flows fluid (e.g. but not limited to natural gas and oil) such as natural gas N. A seal 552 seals the rod piston-housing interface.

The floating piston 522 has a central hole 521 through which extends a top rod 528 which is secured to or formed integrally of the fixed rod piston 524. A seal 558 seals the piston-top rod interface and a seal 556 seals the piston-housing interface. A seal 554 seals the top rod-housing interface.

Pipeline fluid, e.g. natural gas, is supplied into the housing 520 through a fluid flow line 512 and enters the housing 520 through a fluid entry port 538. An isolation valve 514 controls fluid flow in the fluid flow line 512.

As shown in FIG. 21, non-pressurized hydraulic fluid is supplied by an hydraulic power system 570 from a fluid reservoir 565 through flow lines 568, 569, 575, and 581, to both the top and the bottom of the piston 524. Natural gas at typical pipeline pressure is supplied to an emergency shut down valve 550 through a flow line 513. A check valve 519 in a line 511 prevents gas from flowing through the line 511. The emergency shut down valve is piloted closed by pilot pressure supplied from the emergency shut down system.

As shown in FIG. 21 a latch apparatus 540 has a latch arm 541 which abuts a cam 542 on the rod 526 and prevents downward rod movement; i.e., the valve is held open. A spring 543 biased against one inner end of a latch housing 544 with a certain spring force urges the latch arm 541 against the cam 542. The latch arm 542 is secured to or formed integrally of a piston body 545 with a first piston 546 and a second piston 547 spaced apart from the first piston.

A pump control valve 560 controls the flow of hydraulic fluid to and from the housing 520 in the fluid flow lines 568 and 575 and other intercommunicating lines. A filter 561 filters fluid flowing from the reservoir 565 in a flow line 564 to a flow line 566, to a flow line 567 and to flow lines 571 and 572. A pump 580 in the flow line 571 pumps hydraulic fluid to the pump control valve 560. A pressure relief valve 585 on the line 566 provides relief of fluid flow in the event of undesired pressure build-up by the pump 580 and a gauge 586 indicates flow line pressure.

A shuttle valve 587 between flow lines 588, 589, and 591 provides fluid under pressure into the housing 544 to unlatch the latch 540. Pressurized fluid can also be supplied into the housing 544 against the first piston 546 through a flow line 592 from the interior of the housing 520. Pressurized fluid from the flow line 569 is supplied on top of the piston 524 in a space between the two pistons through a hole 593 in the top rod 528, through a central channel 594 of the top rod 528, and out through one or more holes 595 in the top rod 528.

As shown in FIG. 21 the valve Y is open and the latch arm 541 prevents the valve from creeping closed. The emergency shut down valve 550 is preventing pipeline gas from entering the housing 520.

As shown in FIG. 22, there has been a loss of emergency shut down pilot pressure and the emergency shut down valve 550 has activated, supplying pipeline fluid (gas or liquid) under pressure into the housing 520 on top of the floating piston 522, pushing it down in the housing 520 against the piston 524. Pipeline fluid has also passed through the line 592 into the housing 544 to move the latch arm 541 away from the cam 542, freeing the rod 526 for downward movement to effect valve closure. Simultaneously the hydraulic fluid on top of the piston 524 and below it is released to exit the housing 520 and flow back into the reservoir 565. The shuttle valve 587 has allowed fluid between the two pistons 546 and 547 to flow out from the housing 544 and to the reservoir 565.

FIG. 23 shows the valve Y closed by the force of the pipeline fluid and no pipeline fluid and no hydraulic fluid has entered the environment of the pipeline Z. The force of pipeline fluid holds the two pistons down, maintaining the valve closed, and also keeps the latch arm 541 retracted.

To again open the valve Y as shown in FIG. 24, hydraulic fluid under pressure is pumped from the reservoir 565 by the pump 580, through the pump control valve 560, to the underside of the piston 524 and between the pistons 546 and 547 in the housing 544. The pump 580 can be engine or motor driven or manually operated. The emergency shut down valve 550 is positioned to permit the pipeline fluid to flow back into the pipeline Z. The pressurized hydraulic fluid forces the pipeline fluid out of the housing 544 and out of the housing 520.

In FIG. 25, the valve Y is opened and emergency pilot pressure has again been established and supplied to the emergency shut down valve 550 and it is positioned again to prevent pipeline fluid from flowing into the housing 520. Residual pipeline fluid is present in the left end of the housing 544; in the flow line 592; in the top of the housing 520; in the flow line 527; and in the flow line 511; but it is isolated and not pressurized by the fluid in the pipeline. The spring 543 has moved the latch arm 541 out from the housing 544.

FIG. 26 illustrates the initiation of closure of the valve Y by applying pressurized hydraulic fluid through the flow line 569 on top of the piston 524. To accomplish this the pump 580 is activated and the pump control valve 560 is set to permit pressurized hydraulic fluid to be pumped through the lines 568 and 569. Also, the shuttle valve 587 permits the pressurized fluid to flow between the pistons 546 and 547 to withdraw the latch arm 541.

FIG. 27 shows the valve Y closed again by the pressurized hydraulic fluid supplied on top of the piston 524. The floating piston 522 acts as a seal member to provide the chamber between the two pistons into which the pressurized fluid flows to act on the top of the piston 524. Fluid beneath the piston 524 has flowed out through the flow line 581 to the reservoir 565 with the pump control valve set appropriately for such exit flow.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. An actuator for actuating a valve, the valve controlling fluid flow in a conduit, the actuator comprising a housing having a main interior housing space, a rod with a mid-portion, a top end and a bottom end, the mid-portion movably disposed in the housing, the bottom end movably extending from the housing and interconnected with the valve, a first piston member secured to the rod and movable in the housing as the rod moves, a second piston member movably disposed in the housing above the first piston member, the second piston member movable to contact the first piston member, first power means for moving the rod to open or close the valve, and second power means for moving the second piston member to contact the first piston member to move the first piston member and the rod to close the valve.

2. The actuator of claim 1 further comprising the first power means comprising
- a controlled hydraulic power supply for supplying hydraulic fluid under pressure between the first piston member and the second piston member to move the first piston member downwardly to close the valve.

3. The actuator of claim 1 further comprising the first power means including first flow means for flowing pressurized fluid on top of the second piston member to move the second piston member and the first piston member, thereby moving the rod and closing the valve.

4. The actuator of claim 1 further comprising the first power means including second flow means for supplying pressurized fluid beneath the first piston member to hold the first piston member and second piston member up in the housing preventing closure of the valve.

5. The actuator of claim 1 further comprising the second piston member having a central hole therethrough through which movably extends the top end of the rod, the second piston member freely movable on the top end of the rod.

6. The actuator of claim 1 further comprising a thermal relief valve for automatically relieving pressure in the housing to effect closing of the valve.

7. The actuator of claim 1 further comprising an emergency shut down valve for sensing pressure loss in the housing and for effecting closing of the valve.

8. The actuator of claim 7 further comprising pressure re-supply means for re-supplying pressure to the emergency shut down valve to deactivate it.

9. The actuation of claim 1 further comprising releasable latch means for holding the rod to prevent closure of the valve.

10. The actuator of claim 1 wherein the valve is a gate valve.

11. The actuator of claim 1 wherein the valve is a quarter-turn valve.

12. The actuator of claim 1 further comprising the housing having a hollow upper housing extension, and a portion of the top end of the rod movably disposed within the hollow upper housing extension.

13. The actuator of claim 1 wherein a portion of the top end of the rod movably and sealingly extends through a top hole in the housing.

14. The actuator of claim 1 wherein fluid for activating the actuator is not expelled from the actuator into an exterior environment around the actuator and valve.

15. The actuator of claim 2 further comprising the conduit comprising a section of a hydrocarbon pipeline wherein hydrocarbons under pressure flow, the second power means including a flow line interconnecting the hydrocarbon pipeline and the main interior housing space for flowing hydrocarbons under pressure from the hydrocarbon pipeline into the main interior housing space to move the second piston member and the first piston member to close the valve, the second piston member moving upwardly in the main interior housing in response to hydraulic fluid introduced between the first piston member and the second piston member, movement of the second piston member forcing hydrocarbons from the housing back into the hydrocarbon pipeline.

16. The actuator of claim 4 further comprising gaseous fluid under pressure flowing in the conduit, a flow line interconnecting the main interior housing space and the conduit so that an amount of gaseous fluid from the conduit enters the main interior housing above the second piston member and acts as a pneumatic spring on the top of the second piston member.

17. An actuator for actuating a valve, the valve controlling fluid flow in a conduit, the actuator comprising a housing having a main interior housing space, a rod with a mid-portion, a top end and a bottom end, the mid-portion movably disposed in the housing, the bottom end movably extending from the housing and interconnected with the valve, a first piston member secured to the rod and movable in the housing as the rod moves, a second piston member movably disposed in the housing above the first piston member, the second piston member movable to contact the first piston member, first power means for moving the rod to open or close the valve, and second power means for moving the second piston member to contact the first piston member to move the first piston member and the rod to close the valve, the first power means comprising a controlled hydraulic power supply for supplying hydraulic fluid under pressure between the first piston member and the second piston member to move the first piston member downwardly to close the valve, the conduit comprising a section of a hydrocarbon pipeline wherein hydrocarbons under pressure flow, the second power means including a flow line interconnecting the hydrocarbon pipeline and the main interior housing space for flowing hydrocarbons under pressure from the hydrocarbon pipeline into the main interior housing space to move the second piston member and the first piston member to close the valve, the second piston member moving upwardly in the main interior housing in response to hydraulic fluid introduced between the first piston member and the second piston member, movement of the second piston member forcing hydrocarbons from the housing back into the hydrocarbon pipeline, the first power means including first flow means for flowing pressurized fluid on top of the second piston member to move the second piston member and the first piston member, thereby moving the rod and closing the valve, the first power means including second flow means for supplying pressurized fluid beneath the first piston member to hold the first piston member and second piston member up in the housing preventing closure of the valve, a flow line interconnecting the main interior housing and the conduit so that an amount of fluid from the conduit enters the main interior housing above the second piston member and acts as a pneumatic spring on a top of the second piston member, a thermal relief valve for automatically relieving pressure in the housing to effect closing of the valve, an emergency shut down valve for sensing pressure loss in the housing and for effecting closing of the valve, pressure re-supply means for re-supplying pressure to the emergency shut down valve to deactivate it, releasable latch means for holding the rod to prevent closure of the valve, and wherein fluid for activating the actuator is not expelled from the actuator into an exterior environment around the actuator and valve.

18. An actuator for actuating a valve, the valve controlling fluid flow in a conduit, the actuator comprising a housing having a main interior housing space, a rod with a mid-portion, a top end and a bottom end, the mid-portion movably disposed in the housing, the bottom end movably extending from the housing and interconnected with the valve, a first piston member secured to the rod and movable in the housing as the rod moves, a second piston member movably disposed in the housing above the first piston member, first power means for moving the rod to open or close the valve, second power means for moving the second piston member to move the first piston member and the rod to close the valve, the rod having a stop shoulder above the first piston member, and the second piston member movable to contact the stop shoulder to move the rod.

19. The actuator of claim 18 further comprising pressure fluid supply means for supplying pressurized fluid on a top of the second piston member to effect closing of the valve.

20. The actuator of claim 19 further comprising conduit fluid supply means for supplying pressurized fluid from the conduit between the first piston member and the second piston member to effect closing of the valve.

21. The actuator of claim 18 further comprising the conduit comprising a section of a hydrocarbon pipeline wherein hydrocarbons under pressure flow, the second power means including a flow line interconnecting the hydrocarbon pipeline and the main interior housing space for flowing hydrocarbons under pressure from the hydrocarbon pipeline into the main interior housing space to move the second piston member, the rod, and the first piston member to close the valve, the second piston member movable upwardly in the main interior housing space in response to hydraulic fluid introduced between the first piston member and the second piston member, movement of the second piston member forcing hydrocarbons from the housing back into the hydrocarbon pipeline.

22. The actuator of claim 21 further comprising hydrocarbon flow supply means for supplying the hydrocarbons under pressure between the first piston member and the second piston member to effect closing of the valve.

23. An actuator for actuating a valve, the valve controlling fluid flow in a conduit, the actuator comprising a housing having a main interior housing space, a rod with a mid-portion, a top end and a bottom end, the mid-portion movably disposed in the housing, the bottom end movably extending from the housing and interconnected with the valve, a first piston member secured to the rod and movable in the housing as the rod moves, a second piston member movably disposed in the housing above the first piston member, first power means for moving the rod to open or close the valve, second power means for moving the second piston member to move the first piston member and the rod to close the valve, the rod having a stop shoulder above the first piston member, and the second piston member movable to contact the stop shoulder to move the rod, pressure fluid supply means for supplying pressurized fluid on a top of the second piston member to effect closing of the valve, conduit fluid supply means for supplying pressurized fluid from the conduit between the first piston member and the second piston member to effect closing of the valve, the conduit comprising a section of a hydrocarbon pipeline wherein hydrocarbons under pressure flow, the second power means including a flow line interconnecting the hydrocarbon pipeline and the main interior housing space for flowing hydrocarbons under pressure from the hydrocarbon pipeline into the main interior housing to move the second piston member, the rod, and the first piston member to close the valve, and the second piston member movable upwardly in the main interior housing space in response to hydraulic fluid introduced between the first piston member and the second piston member, movement of the second piston member forcing hydrocarbons from the housing back into the hydrocarbon pipeline.

24. An actuator for actuating a valve, the valve controlling fluid flow in a conduit, the actuator comprising a first housing having a first main interior housing space, a second housing having a second main interior housing space, the second housing spaced apart from the first housing, a rod with a mid-portion, a top end and a bottom end, the mid-portion movably disposed for movement between the two housings, the top end movably extending into the first housing, the bottom end movably extending into the second housing, and the mid portion of the rod interconnected with the valve, a first piston member secured to the top end of the rod and movably in the first housing as the rod moves, a second piston member secured to the bottom end of the rod and movable in the second housing as the rod moves, first power means for moving the first piston member to move the rod to close the valve, and second power means for moving the second piston member to move the rod to close the valve.

25. The actuator of claim 24 further comprising the first power means comprising a controlled hydraulic power supply for supplying hydraulic fluid under pressure to the first piston member to move the first piston member to close the valve.

26. The actuator of claim 25 further comprising the conduit comprising a section of a hydrocarbon pipeline wherein hydrocarbons under pressure flow, the second power means including a flow line interconnecting the hydrocarbon pipeline and the first main interior housing space for flowing hydrocarbons under pressure from the hydrocarbon pipeline into the first main interior housing to move the first piston member to close the valve.

27. The actuator of claim 24 further comprising the first power means including first flow means for supplying pressurized fluid beneath the first piston member to hold the first piston member and second piston member up in the housing preventing closure of the valve.

28. The actuator of claim 27 further comprising gaseous fluid under pressure flowing in the conduit, a flow line interconnecting the first main interior housing and the conduit so that an amount of gaseous fluid from the conduit enters the first main interior housing above the first piston member and acts as a pneumatic spring on a top of the first piston member.

29. The actuator of claim 24 further comprising a thermal relief valve for automatically relieving pressure in the housing to effect closing of the valve.

30. The actuator of claim 24 further comprising an emergency shut down valve for sensing pressure loss in the housing and for effecting closing of the valve.

31. The actuator of claim 24 further comprising pressure re-supply means for re-supplying pressure to the emergency shut down valve to deactivate it.

32. The actuator of claim 24 wherein fluid for activating the actuator is not expelled from the actuator into an exterior environment around the actuator and valve.

33. An actuator for actuating a valve, the valve controlling fluid flow in a conduit, the actuator comprising a first housing having a first main interior housing space, a second housing having a second main interior housing space, the second housing spaced apart from the first housing, a rod with a mid-portion, a top end and a bottom end, the mid-portion movably disposed for movement between the two housings, the top end movably extending into the first housing, the bottom end movably extending into the second housing, and the mid portion of the rod interconnected with the valve, a first piston member secured to the top end of the rod and movably in the first housing as the rod moves, a second piston member secured to the bottom end of the rod and movable in the second housing as the rod moves, first power means for moving the first piston member to move the rod to close the valve, second power means for moving the second piston member to move the rod to close the valve, the first power means comprising a controlled hydraulic power supply for supplying hydraulic fluid under pressure to the first piston member to move the first piston member to close the valve, the conduit comprising a section of a hydrocarbon pipeline wherein hydrocarbons under pressure flow, the second power means including a flow line interconnecting the hydrocarbon pipeline and the first main interior housing space for flowing hydrocarbons under pressure from the hydrocarbon pipeline into the first main interior housing space to move the first piston member to close the valve, a flow line interconnecting the first main interior housing and the conduit so that an amount of fluid from the conduit enters the first main interior housing above the first piston member and acts as a pneumatic spring on a top of the first piston member, a thermal relief valve for automatically relieving pressure in the housing to effect closing of the valve, an emergency shut down valve for sensing pressure loss in the housing and for effecting closing of the valve, pressure re-supply means for re-supplying pressure to the emergency shut down valve to deactivate it, and wherein fluid for activating the actuator is not expelled from the actuator into an exterior environment around the actuator and valve.

* * * * *